(12) United States Patent
Bengio et al.

(10) Patent No.: US 8,589,457 B1
(45) Date of Patent: *Nov. 19, 2013

(54) TRAINING SCORING MODELS OPTIMIZED FOR HIGHLY-RANKED RESULTS

(75) Inventors: Samy Bengio, Los Altos, CA (US); Gal Chechik, Rinatia (IL); Sergey Ioffe, Mountain View, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,108

(22) Filed: Sep. 14, 2012

Related U.S. Application Data

(63) Continuation of application No. 13/342,532, filed on Jan. 3, 2012, now Pat. No. 8,429,212, which is a continuation of application No. 12/624,001, filed on Nov. 23, 2009, now Pat. No. 8,131,786.

(51) Int. Cl.
G06F 17/00 (2006.01)

(52) U.S. Cl.
USPC ........... 707/821; 707/913; 707/825; 707/745; 707/736; 707/732

(58) Field of Classification Search
USPC .................. 707/915, 913, 825, 745, 736, 732
See application file for complete search history.

(56) References Cited

U.S. PATENT DOCUMENTS 7,546,293 B2 * 6/2009 Zhang et al. ........................ 1/1

OTHER PUBLICATIONS

Burges et al., Learning to Rank using Gradient Descent, Proceedings of the 22nd International Conference on Machine Learning, 2005, pp. 89-96.
Burges et al., Learning to Rank with Nonsmooth Cost Functions, NIPS, 2006, 8 pages.
Burges, Learning to Rank for Web Search: Some New Direction, Web Learning Group Microsoft Research, SIGIR Ranking Workshop, Jul. 27, 2007, 88 pages.
Cao et al, Learning to Rank: From Pairwise Approach to Listwise Approach, Proceedings of the 24th International Conference on Machine Learning, 2007, pp. 129-136.
Caruana et al., Using the Future to "Sort Out" the Present: Rankprop and Multitask Learning for Medical Risk Evaluation, Advances in Neural Information Processing Systems 8, Proceedings of the 1995 Conference, 1995, pp. 959-965.
Crammer and Singer, Pranking with Ranking, Advances in Neural Information Processing Systems 14, vol. 1, Proceedings of the 2002 Conference, 2002, pp. 641-647.
Freund et al., An Efficient Boosting Algorithm for Combining Preferences, 2003, J of Machine Learning Research, vol. 4, pp. 933-969.

(Continued)

Primary Examiner — Sana Al Hashemi
(74) Attorney, Agent, or Firm — Fish & Richardson P.C.

(57) ABSTRACT

Methods, systems, and apparatus, including computer programs encoded on computer storage media, for training scoring models. One method includes storing data identifying a plurality of positive and a plurality of negative training images for a query. The method further includes selecting a first image from either the positive group of images or the negative group of images, and applying a scoring model to the first image. The method further includes selecting a plurality of candidate images from the other group of images, applying the scoring model to each of the candidate images, and then selecting a second image from the candidate images according to scores for the images. The method further includes determining that the scores for the first image and the second image fail to satisfy a criterion, updating the scoring model, and storing the updated scoring model.

20 Claims, 4 Drawing Sheets

(56) References Cited

OTHER PUBLICATIONS

Friedman, 1999 Reitz Lecture, Greedy Function Approximation: A Gradient Boosting Machine, 2001, vol. 29, No. 5, pp. 1189-1232.

Grangier and Bengio, A Discriminative Kernel-based Model to Rank Images from Text Queries, IEEE Transactions on Pattern Analysis and Machine Intelligence, 2008, vol. 30, No. 8, pp. 1-14.

Harrington, Online Ranking/Collaborative filtering using the Perceptron Algorithm, Proceedings of the Twentieth International Conference on Machine Learning, ICML-2003, pp. 250-257.

Herbrich et al., Support Vector Learning for Ordinal Regression, Artificial Neural Networks, Sep. 7-10, 1999, Conference Publication No. 470, pp. 97-102.

Joachims, Optimizing Search Engines using Clickthrough Data, Proceedings of the ACM Conference on Knowledge Discovery and Data Mining (KDD), ACM, 2002, pp. 133-142.

Le et al., Optimization of Ranking Measures, J of Machine Learning Research 1 (2999) 1-48, 2010, pp. 1-29.

Li et al., Learning to Rank Using Classification and Gradient Boosting, NIPS, 2007, pp. 1-10.

Spall, Multivariate Stochastic Approximation Using a Simultaneous Perturbation Gradient Approximation, IEEE Transactions on Automatic Control, 1992, vol. 37, No. 3, pp. 332-341.

Tsai et al., FRank: A Ranking Method with Fidelity Loss, SIGIR 2007 Proceedings, Session 16: Learning to Rank II, 2007, pp. 383-390.

Xu and Li, AdaRank: A Boosting Algorithm for Information Retrieval, SIGIR 2007 Proceedings, Session 16: Learning to Rank II, 2007, pp. 391-398.

Yue et al., A Support Vector Method for Optimizing Average Precision, SIGIR 2007 Proceedings, Session 12: Learning to Rank I, 2007, pp. 271-278.

\* cited by examiner

TRAINING SCORING MODELS OPTIMIZED FOR HIGHLY-RANKED RESULTS

CROSS-REFERENCE TO RELATED APPLICATIONS

This application is a continuation application of and claims priority to U.S. application Ser. No. 13/342,532, filed on Jan. 3, 2012, entitled "Training Scoring Models Optimized For Highly-Ranked Results," which is a continuation of U.S. application Ser. No. 12/624,001, filed on Nov. 23, 2009 (now U.S. Pat. No. 8,131,786), entitled "Training Scoring Models Optimized For Highly-Ranked Results," the entirety of each of these applications is hereby incorporated herein by reference.

BACKGROUND

This specification relates to ranking search results using scoring models.

Internet search engines provide information about Internet accessible resources, e.g., Web pages, images, text documents, and multimedia content, that are responsive to a user's search query and present information about the resources in a manner intended to be useful to the user. Internet search engines return a set of search results in response to a user submitted query, e.g., as a ranked (i.e., ordered) list of results. The search results can be ranked in an order according to scores for the search results. The scores can be determined by applying a scoring model to each of the search results. Different scoring models assign different scores to the search results.

Scoring models for scoring resources can be trained using machine learning techniques that train the model using positive and negative resources for the query. Conventional techniques for training scoring models focus on training scoring models to be good overall, for all positive and negative resources for the query.

SUMMARY

In general, one aspect of the subject matter described in this specification can be embodied in methods that include the actions of storing data identifying a plurality of training images for a query, wherein each of the training images is classified as being in a positive group of images for the query or a negative group of images for the query according to a respective query-specific preference measure for the image; selecting a first image from either the positive group of images or the negative group of images, and applying a scoring model to the first image to determine a score for the first image; selecting a plurality of candidate images from the other group of images; applying the scoring model to each of the candidate images to determine a respective score for each candidate image, and then selecting a second image from the candidate images, the second image having a highest score; and determining that the scores for the first image and the second image fail to satisfy a criterion, wherein the criterion requires that a result of the score of the image selected from the positive group of images minus the score of the image selected from the negative group of images exceeds a threshold, updating the scoring model, and storing the updated scoring model. Other embodiments of this aspect include corresponding systems, apparatus, and computer programs recorded on computer storage devices, each configured to perform the operations of the methods.

These and other embodiments can each optionally include one or more of the following features. Selecting the first image can include selecting a plurality of first candidate images from either the positive group of images or the negative group of images; applying the scoring model to each of the first candidate images to determine a respective score for each first candidate image; and selecting as the first image an image having a highest score from among the first candidate images. The first image can be selected from the positive group of images and the plurality of candidate images can be selected from the negative group of images. The first image can be selected from the negative group of images and the plurality of candidate images can be selected from the positive group of images.

The respective query-specific preference measure for each image can be derived from a number of times users select the image in response to being presented with a search result for the query that includes the image. The threshold can be greater than zero. The method can further include in response to receiving the query through a search interface, identifying a plurality of images responsive to the query; applying the scoring model to each of the plurality of images to determine a respective score for each image; and presenting images from the plurality of in the search interface, wherein the images are presented in an order according to the respective score for each image. The scoring models can be query specific, and the operations can further comprise updating and storing query-specific scoring models for a plurality of queries.

The method can further include repeating selecting the first image, selecting the second image, and updating the scoring model until a training condition is satisfied. The candidate images can include one or more previously-considered images each having a score that satisfies a threshold.

Particular embodiments of the subject matter described in this specification can be implemented so as to realize one or more of the following advantages. Scoring models can be learned for individual queries. Scoring models can be optimized so that they provide the most accurate scores for the highest-ranked queries. Scoring models can be trained using larger training sets. Scoring models can be trained on small training sets and applied to larger training sets.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
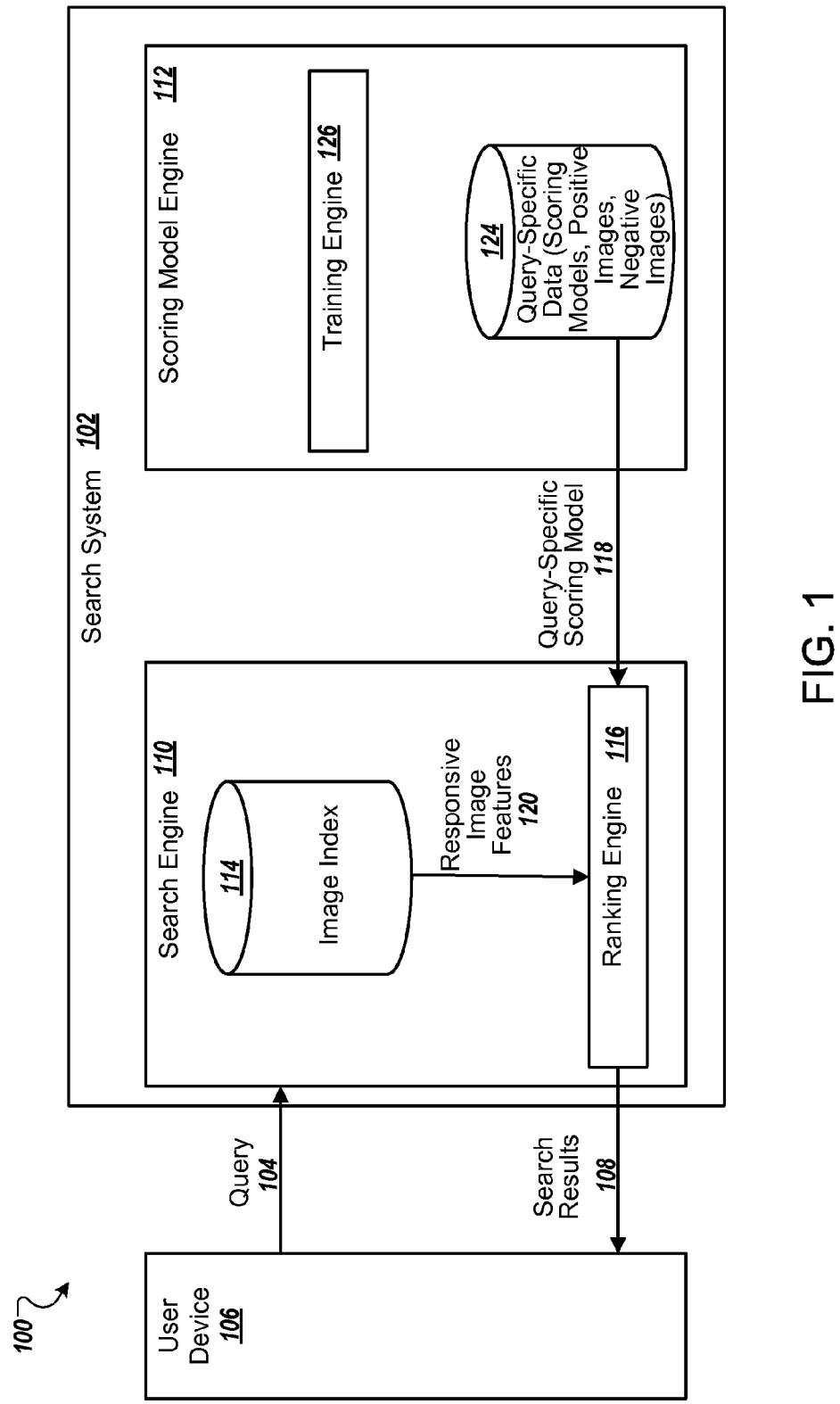
FIG. 1 illustrates an example system that uses scoring models trained using methods described in this specification.

FIG. 1 illustrates an example system 100 that uses scoring models trained using methods described in this specification. The system includes a search system 102 and a user device 106. The search system 102 receives queries 104 from a user device 106 and presents search results 108 to the user device, for example, through a network. The user device 106 submits queries 104 to the search system 102, receives search results 108 from the search system 102, and presents the search results to a user.

The search system 102 includes a search engine 110 and a scoring model engine 112. The search engine 110 receives the query 104 from the user device 106. In response to receiving the query 104, the search engine 110 identifies images indexed in its image index 114 that are responsive to the query 104. Images include, for example, still images, video, and other visual content. The image index 114 associates an identifier for each image with data for the image. The data for the image includes, for example, keywords used to determine when the image is relevant to queries, details on where to obtain the image, and optionally image features extracted from the image. Image features are described in more detail below, with reference to FIG. 2, and can be stored in other places in the search system 102, for example, a feature cache separate from the image index 114. The search engine 110 identifies a number of images that are responsive to the query 104. This can be done using conventional techniques, for example, based on how well text associated with the images matches the query.

The search engine 110 then ranks the responsive images using a ranking engine 116 that applies a query-specific scoring model 118 to the features for each image. The ranking engine 116 can receive the features for the responsive images 120 from the image index 114. Alternatively, the ranking engine 116 can receive the responsive images themselves and extract the features for each image. The ranking engine 116 can receive the responsive images, for example, from an image cache maintained by the search system 102, or from the original source of the image.

The scoring model 118 is specific to the query 104, and specifies a weight for each of a number of image features. In some implementations, the scoring model is implemented as a passive-aggressive model for image retrieval ("PAMIR"). One example of a PAMIR is described in Grangier, David and Samy Bengio, "A Discriminative Kernel-based Model to Rank Images from Text Queries," IEEE Transactions on Pattern Analysis and Machine Intelligence, vol. 30 (2208), pp. 1371-1384, which description is incorporated herein by reference in its entirety. A PAMIR is a linear model that can be applied to non-linear decisions. A PAMIR is implemented as a vector of weights, with each weight corresponding to a distinct image feature. The model is trained by iteratively computing dot products of the vector of weights representing the model and feature vectors representing the images, and appropriately updating the weights after each iteration.

The ranking engine 118 receives the query-specific scoring model 122 from a store of query-specific data 124 maintained by the scoring model engine 112. The query-specific data 124 includes, for each of a number of queries, a scoring model for the query, and positive and negative images for the query. The query-specific data 124 is used and updated by a training engine 126. The query-specific data 124 and training engine 126 are described in more detail below with reference to FIGS. 2 and 3.

To determine the score for a given image, the ranking engine 118 applies the model to the image features, for example, by taking the dot product of a vector of the image features and a vector of the weights for the image features. For example, the score can be calculated according to the formula:

$$\text{score} = W \cdot X,$$

where W is a vector storing the weights for the query-specific scoring model 118, and X is a vector of feature values for an image responsive to the query 104. Once the ranking engine 118 calculates a score for each image, the ranking engine 118 ranks the responsive images 116 according to their scores. The search engine 110 then generates a search results page 108 that includes the images in ranked order and sends the search results page 108 to the user device 106.

The user device 104 submits search a query 106 to the search system 104, receives the search results page 108 with the images responsive to the query, and renders the search results page 108 for presentation to a user. When a user clicks, e.g., selects with a mouse or other input device, an image in the search results page 108, the user device 106 sends data about the selection to the search system 102. The scoring model engine 112 uses this data to identify positive and negative images for the query, as will be described in more detail below with reference to FIG. 2.

While the above describes ranking images responsive to a user query, similar techniques can be used for ranking other resources, for example, documents, by applying query-specific scoring models trained on features of the documents.

Figure 2:
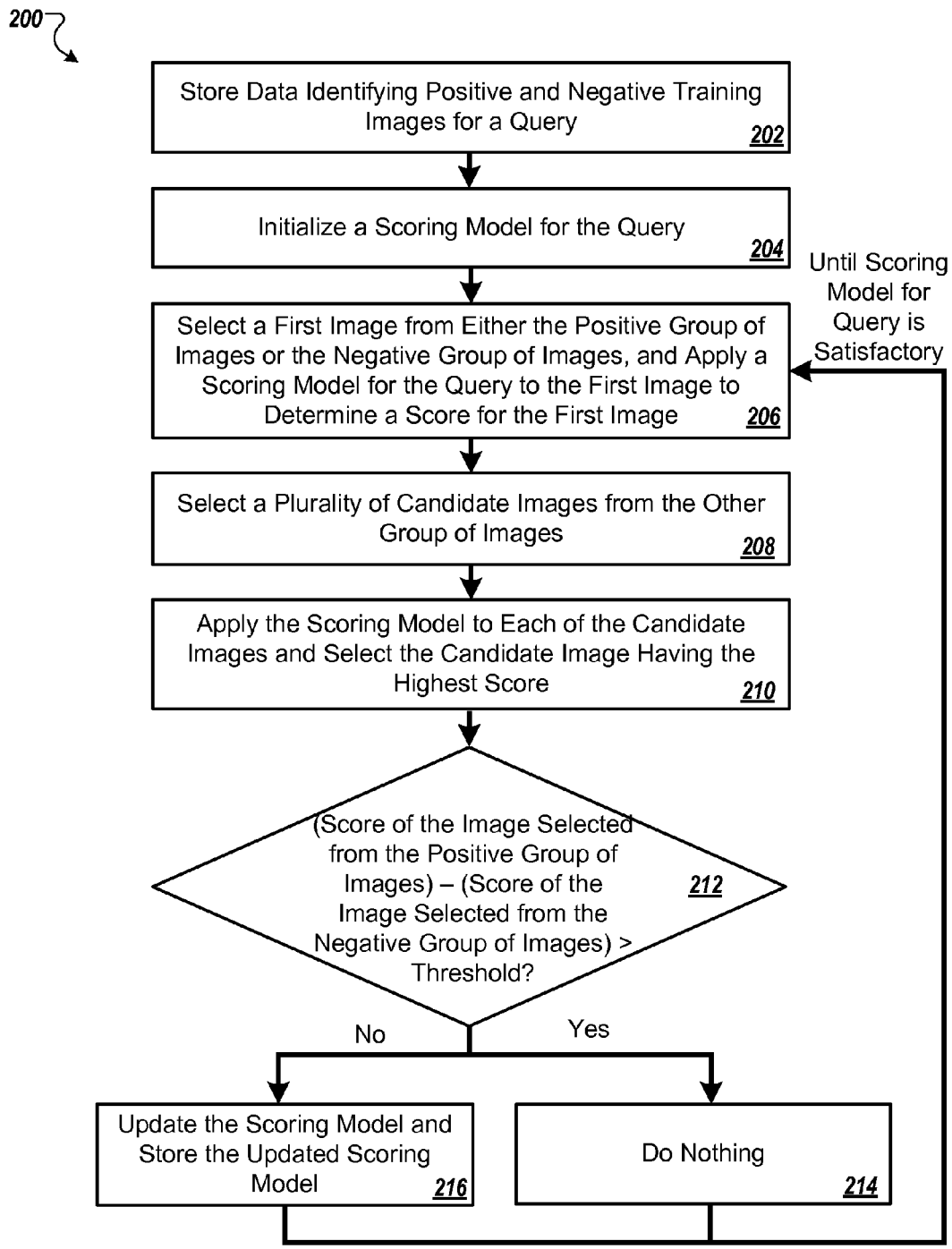
FIG. 2 illustrates an example method for training a query-specific scoring model.

FIG. 2 illustrates an example method 200 for training a query-specific scoring model. For convenience, the method will be described with reference to a system that performs the method 200. The system can be, for example, the training engine 126 described above with reference to FIG. 1. The system optimizes the scoring model during training, so that the scoring model is most accurate at scoring the most highly ranked images.

For convenience, the system will be described as training a single query-specific scoring model. However, the system can train multiple query-specific scoring models, either in sequence or in parallel.

The system stores data identifying a plurality of training images for a query, where each training image is classified as being in a positive group of images or a negative group of images for the query (202). The training images are images that are responsive to the query. The images are divided into a positive group of images and a negative group of images according to a query-specific user preference measure for each image. Images that have a query-specific preference measure that exceeds a first threshold are classified as positive training images and images that have a query-specific preference measure that is below a second threshold are classified as negative training images. The first and second threshold can be the same, or different, thresholds. The first and second thresholds are determined, for example, empirically.

The query-specific preference measure is derived from user behavior data, and estimates whether users find the images relevant to the query. An example query-specific preference measure is a click-through-rate for the image for the query. The click-through-rate is the number of times users selected the image when it was presented as a search result for the query divided by the total number of times the image was presented as a search result for the query.

Each training image has one or more associated features that represent visual characteristics of the image. Example features include color, texture, edges, and other characteristics of the image. The features can be stored in the index, as described above with reference to FIG. 1, can be stored in a separate feature cache, or can be extracted from the images as needed. The features can be extracted, for example, when a search system crawls web pages to extract content for its index, or at a later time. Example processes for extracting features include scale-invariant feature transform, edge detection, and corner detection. Example features are described in more detail below.

In the following description, image can mean the image itself, or features extracted from the image, depending on whether the system pre-extracts the features from the images, or extracts them as needed to apply the scoring model.

The system initializes a scoring model for the query (204). The system initializes the scoring model by assigning default values to the weights in the scoring model. The system can determine appropriate default values, for example, according to values of weights for a model that was trained for a similar query, or based on the values of weights for a model that was trained using similar training images. Alternatively, the system can assign each of the weights a default value of zero.

The system then begins the training process. Ideally, the system would rank all of the images according to their scores, and train the model by comparing the highest ranked positive images with the highest ranked negative images. However, ranking the images is very time consuming. The system approximates the full ranking process by selecting multiple images from either the positive group of images or the negative group of images, and then selecting the highest scoring image. Because the system selects multiple images, and then selects the highest-ranked image, the probability of any given image being used in the comparison changes from a uniform probability to a probability that is roughly proportional to the image's rank raised to the number of candidate images minus one.

As part of the training process, the system repeatedly iterates through the steps of the training process described below until a training condition is satisfied. The training condition is described in more detail below.

The system selects a first image from either the positive group of images or the negative group of images, and applies a scoring model for the query to the first image to determine a score for the first image (206). The system applies the scoring model, for example, as described above with reference to FIG. 1.

The system selects candidate images from the other group of images (208). For example, when the system selected the first image from the positive group of images, the system selects the candidate images from the negative group of images. Similarly, when the system selected the first image from the negative group of images, the system selects the candidate images from the positive group of images. The system selects the candidate images, for example, by arbitrarily selecting images. For example, the system can randomly select candidate images according to a uniform distribution. The system can select any number of candidate images. The number is generally greater than one and less than the total number of images in the other group of images. The number of images is chosen to balance the number of images that the system can reasonably handle without a significant decrease in speed with the benefits that come from the additional emphasis put on higher-ranked images when more images are chosen. The number can be, for example, three, four, or five.

The system applies the scoring model to each of the candidate images, and then selects the candidate image having the highest score (210). The system applies the scoring model to each of the candidate images, for example, as described above with reference to FIG. 1. Selecting the candidate image with the highest score allows the system to compare the best image from the group of candidate images to the first image. This results in a scoring model that is optimized to give the most accurate scores to the most highly ranked images.

In some implementations, the system stores data identifying one or more previously-considered images from the same group of images that the candidate images are selected from. Previously-considered images are images that were considered in a prior iteration of the training process for the query. Data identifying a previously-considered image is stored when the image has a particularly high score for the query. For example, the system can store data identifying one or more previously-considered images having a score that exceeds a threshold. The candidate images can include both these previously-considered images and other images selected from the group of images. This introduces higher scoring images into the group of candidate images, and therefore can further increase the likelihood that better-ranked images are selected.

The system then subtracts the score of the image selected from the negative group of images from the score of the image selected from the positive group of images, and compares the difference to a threshold (212). The threshold can be empirically chosen. In some implementations, the threshold is greater than zero.

If the difference exceeds a threshold, the scoring model behaved as desired, and does not need to be updated (214). However, if the difference does not exceed the threshold, the scoring model needs to be updated (216). The scoring model is updated to increase the difference between the positive image score and the negative image score by adjusting the vector of weights. In some implementations, the system updates the scoring model by modifying the vector of weights of the scoring model such that each weight is proportional to a minimum difference between the feature vectors for the images The vector of weights can also be adjusted such that each weight is proportional to a maximum of a specified aggressiveness constant and the distance between the positive and negative scores divided by and an Euclidean norm of a vector representing the difference between the feature vectors for the images. The specified aggressiveness constant is a constant that controls a tradeoff between minimizing expected error of future iterations and maintaining low vector weights.

For example, in some implementations, the query-specific weights $w_i$ after iteration i can be updated according to the following equation:

$$w_i = w_{i-1} + \tau_i(p_{i+} - p_{i-}),$$

where $w_{i-1}$ is the weight vector from the previous iteration, and $\tau_i$ is determined according to the following equation:

$$\tau_i = \min\left\{c, \frac{l(w_{i-1}; (p_{i+}, p_{i-}))}{\|p_{i+} - p_{i-}\|^2}\right\},$$

where c is a parameter chosen to control the trade-off between maximizing the margin between positive and negative images and satisfying the other training constraints, $q_i$ is a representation of the query on which the model is being trained, $p_{i+}$ is a representation of the current positive image being considered, $p_{i-}$ is a representation of the current negative image being considered, and l(w, p+, p−) is determined as described below.

l(w, p+, p−) is the function:

$$l(w, p_+, p_-) = \max(0, 1 - w \cdot (p_+ + p_-)).$$

The system repeats the steps of the training process until a training condition is satisfied. In some implementations, the training condition can require that the average number of adjustments of the vector of weights over a given number of iterations be below a threshold. For example, the training condition can specify that a trained model be a model that has been adjusted following no more than 10 of the last 10,000 iterations. In this example, when a model having a vector of weights that has only been adjusted 9 out of the last 10,000 iterations, the training condition is satisfied.

In other implementations, the training condition can specify that the average value adjustment of the vector of weights be less than a threshold amount. For example, the difference between the weights of the vector prior to an iteration and following the iteration can be computed. The average difference over a given number of previous iterations can be computed. When the average difference is less than the threshold amount, the training condition is satisfied.

In some implementations, the system selects the first image much as the system selects the candidate image from the other group of images, e.g., by selecting multiple images from the other group of images, applying the scoring model to each of the images to obtain a score for the image, and then selecting the image with the highest score as the first image. Selecting both the positive and the negative image in this way can further result in a model that determines more accurate scores for more highly ranked images.

In some implementations, the features for an image include features extracted from the image at different scales. For example, a first set of features may be extracted from the full scale of the image as it is presented to a user device, while other sets of features may be extracted at 75%, 50%, and 25% of the full scale of the image.

In some implementations, the features are indexed according to feature categories. Feature categories are a predefined set of reference features with which individual features that are sufficiently similar can be categorized, even though the individual features may vary slightly. For example, similar features can be categorized in the same feature category even though slight variations exist in the illumination or color of the images from which the features were extracted.

The features of images can be indexed by feature categories based on a frequency with which the features occur in various scaled versions of the image. The features can be indexed by feature category without reference to spatial relation of the features in the image. Indexing the features without a reference to the spatial relation of the features in the image results in a "bag of features" for the image. The bag of features for the image includes a frequency of features that satisfy each feature category without considering where each of the features occurs in the image. Therefore, each image is characterized by a frequency distribution of the feature categories in which the features are categorized. Indexing features of images as "a bag of features" facilitates characterization of an image without regard to the scale of the image.

In some implementations, the feature categories can be defined based on a sparse vector of discrete features. The discrete features are learned, for example, based on k-means clustering of features that are extracted from a set of training images. For example, edge histograms, e.g., texture features, and color histograms, e.g., color features, can be generated for a top 10,000 most selected images.

The features can be extracted from each of a plurality of overlapping square portions of each image. The edge histograms are based on differences in intensities of circular portions of the image that are centered at each pixel, referred to as a center pixel, of the square portions. For each circular portion, an intensity of the center pixel is compared to interpolated intensities of pixels that are located at eight equally spaced locations on an outer edge of the circular portion. Each of the pixels is determined to have a lower or greater intensity than the center pixel, and is assigned a respective 0 or 1 binary value based on the determination.

The eight binary values provide an eight-bit sequence that represents the texture of the circular portion. This eight-bit binary sequence can be represented as a 256-bin histogram. However, the bins corresponding to non-uniform sequences, i.e., sequences having more than two 1 to 0 or 0 to 1 transitions, can be merged, thereby allowing each of the 256 bin histograms to be mapped to 59 bin histograms, and resulting in a sparse representation of the texture content feature value.

The color histograms for each pixel are generated based on k-means clustering. A color codebook is learned from red-green-blue pixels of training images, and a color histogram for a square portion of the image is determined by mapping each pixel in the square portion to the color to which the pixel most closely corresponds.

The edge histograms and color histograms for an image can be represented as a sparse vector of features by mapping each vector of image features to a discrete index, i.e., feature category, referred to as a visual term. First, concatenated vectors are generated by concatenating each pair of vectors that represent the edge and color histograms, respectively. Then each concatenated vector for an image is mapped to a corresponding visual term. The visual term to which a concatenated vector corresponds is determined, for example, based on relationships that have been identified between the concatenated vectors visual terms.

Relationships between the concatenated vectors and the visual terms are identified, for example, by using a machine learning algorithm to learn the relationships from the concatenated vectors of content feature values for the training images based on k-means clustering. The weight of each visual term can be determined, for example, based on the following relationship:

$$p_i = \frac{f_i \times idf_i}{\sqrt{\sum_{j=1}^{C} (f_j \times idf_j)^2}},$$

where $p_i$ is the weight of the visual term i in an image p;
$f_i$ is the frequency of the visual term i in an image p;
$f_j$ is the frequency of the visual term j in the image p;
$idf_i$ is the inverse document frequency of the visual term i, defined as $-\log(r_i)$, where $r_i$ is a fraction of training images containing at least one occurrence of visual term i;
$idf_j$ is the inverse document frequency of visual term j, defined as $-\log(r_j)$, where $r_j$ is a fraction of training images containing at least one occurrence of visual term j; and
C is the number of visual terms.

The above relationship provides visual term weights that normalize the sparse vector that results from mapping each of the concatenated vectors for an image to visual terms. The normalization emphasizes concatenated vector values that correspond to rare visual terms, i.e., visual terms that appear in less than a threshold portion of all images. The normalization also de-emphasizes concatenated vector values that correspond to common visual terms, i.e., visual terms that appear in more than a threshold portion of all images. Thus, according to the above relationship, the less frequent a visual term appears in a corpus of images, the more informative the visual term is, and in turn, the higher the weight the visual term receives.

Figure 3:
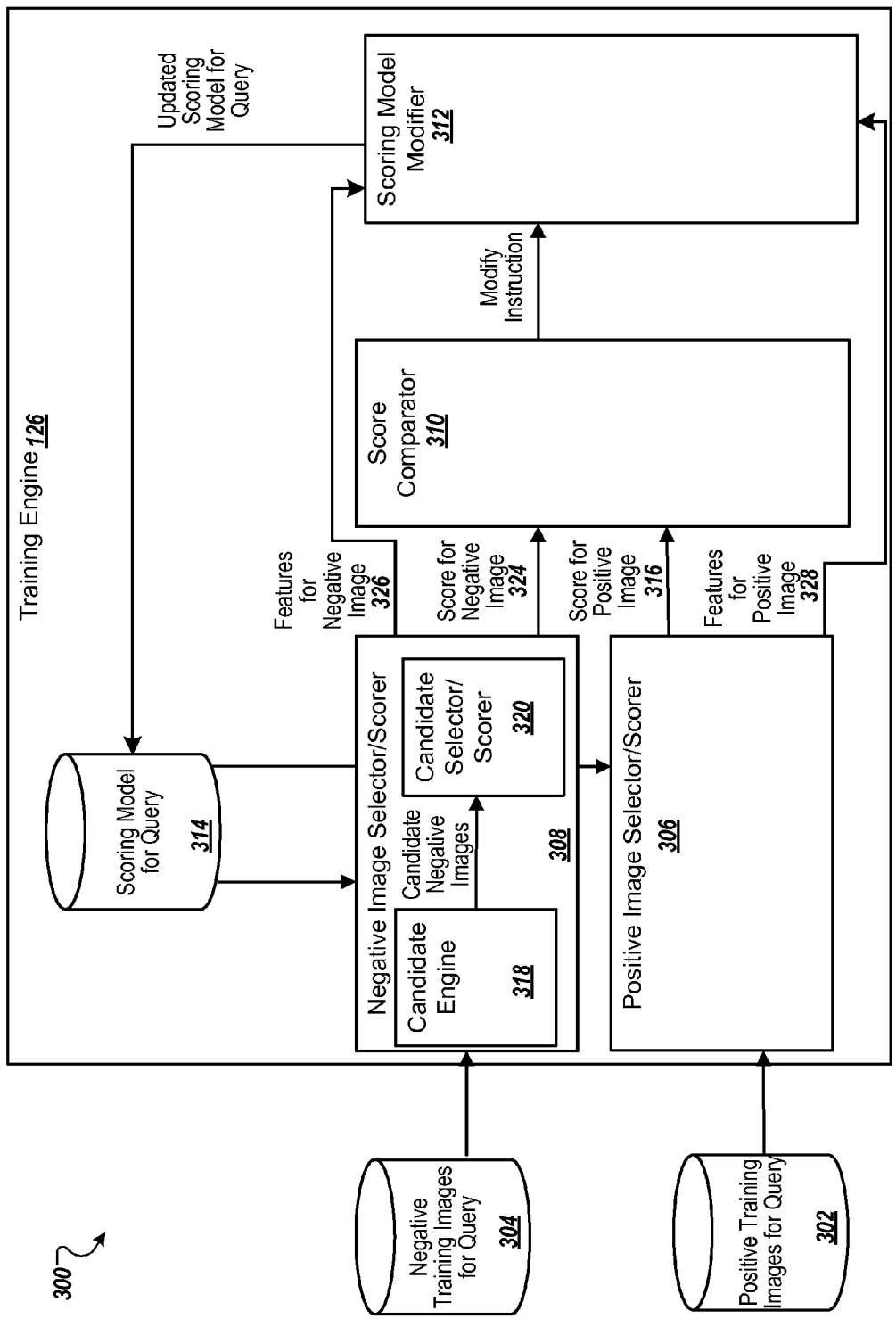
FIG. 3 illustrates an example architecture of a training engine.

FIG. 3 illustrates an example architecture of the training engine 126. The training engine 126 trains query-specific scoring models, for example, using the method described above with reference to FIG. 2. The specific training engine illustrated in FIG. 3 selects the first image from the group of positive images 302 and the candidate images from the group of negative images 304; however, other training engines can select the candidate images from the positive images 302, or select candidate images from both the positive and negative images, as described above with reference to FIG. 2. The positive 302 and negative 304 images can be the images themselves or features extracted from the images.

The training engine 126 includes a positive image selector/scorer 306, a negative image selector/scorer 308, a score comparator 310, and a scoring model modifier 312. The training engine 126 uses these components to train a query-specific scoring model 314.

The positive image selector/scorer 306 selects a positive image from the positive training images 302 for the query, and applies the scoring model 314 to the features of the positive image to generate a score 316 for the positive image, for example, as described above with reference to FIG. 2.

The negative image selector/scorer 308 includes a candidate engine 318 and a candidate selector/scorer 320. The candidate engine 318 selects candidate images 322 from the negative images 304 for the query, for example, as described above with reference to FIG. 2. The candidate selector/scorer 320 scores each image and selects the image having the highest score, for example, as described above with reference to FIG. 2.

The score comparator 310 receives the score for the positive image 316 and the score for the negative image 324, calculates the difference between the score for the positive and the negative image, and determines whether the difference exceeds a threshold, for example, as described above with reference to FIG. 2. If so, the score comparator 310 instructs the scoring model modifier 312 to update the scoring model. The scoring model modifier 312 updates the scoring model based on the features of the negative image 326 and the features of the positive image 328, for example, as described above with reference to FIG. 2.

While the above describes training a query-specific scoring model, the same techniques can be used to train a general scoring model that takes a query and an image as an input and generates a score for the query for the image. For example, a system can perform the same iterations, but update the model according to both the positive and negative image selected and the query itself.

For example, when the query is a parameter to the scoring model, the weights $w_i$ after iteration i can be updated according to the following equation:

$$w_i = w_{i-1} + \tau_i v_i$$

where is the weight vector from the previous iteration, and $\tau_i$ and $v_i$ are determined according to the below equations.

$\tau_i$ can be determined according to the following equation:

$$\tau_i = \min\left\{c, \frac{l(w_{i-1}; (q_i, p_{i+}, p_{i-}))}{\|v_i\|^2}\right\}$$

where c is a parameter chosen to control the trade-off between maximizing the margin between positive and negative images and satisfying the other training constraints, $q_i$ is a representation of the query on which the model is being trained, $p_{i+}$ is a representation of the current positive image being considered, $p_{i-}$ is a representation of the current negative image being considered, and $l(w, q, p+, p-)$ and $v_i$ are determined as described below.

$l(w, q, p+, p-)$ is the function:

$$l(w, q, p_+, p_-) = \max(0, 1 - w \cdot \gamma(q, p_+) + w \cdot \gamma(q, p_-)),$$

where $\gamma(q,p)$ is the vector $(q_1 p, \ldots q_T p)$, where the terms of the query are $(q_1 \ldots q_T)$.

$v_i$ can be determined according to the following equation:

$$v_i = \gamma(q_i, p_{i+}) - \gamma(q_i, p_{i-}),$$

where $\gamma(q,p)$, $q_i, p_{i+}$, and $p_{i-}$ are determined as described above.

Figure 4:
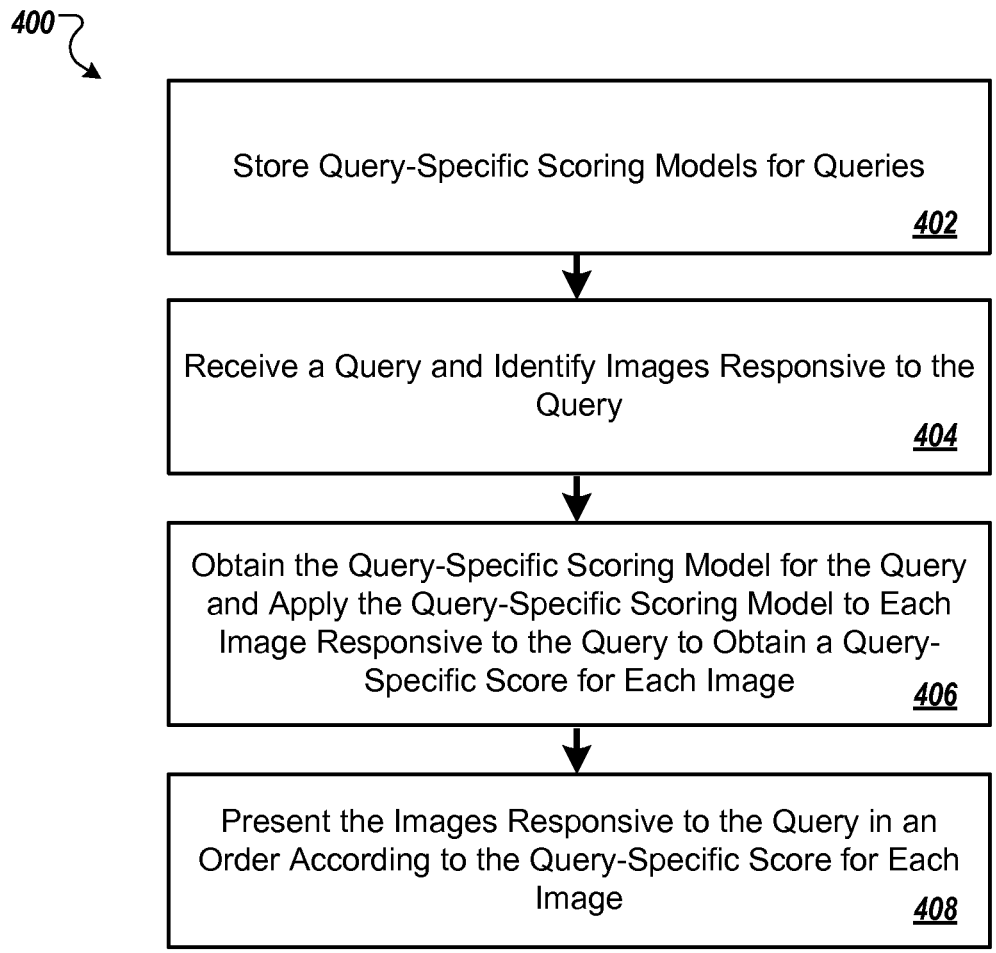
FIG. 4 illustrates an example method for using a query-specific scoring model to score images responsive to a query.

FIG. 4 illustrates an example method 400 for using a query-specific scoring model to score images responsive to a query. For convenience, the method will be described with reference to a system that performs the method 400. The system can be, for example, the search system 102 described above with reference to FIG. 1.

The system stores trained query-specific scoring models for queries (402), for example, as described above with reference to FIG. 1. The system receives a query and identifies images responsive to the query (404), for example, as described above with reference to FIG. 1.

The system obtains the query-specific scoring model for the query and applies the query-specific scoring model to each image responsive to the query to obtain a query-specific score for each image (406), for example, as described above with reference to FIG. 1.

The system presents the images responsive to the query in an order according to the query-specific score for each image (408), for example, as described above with reference to FIG. 1.

While the above describes using a query-specific scoring model to score images responsive to a query, a non query-specific scoring model. The same non query-specific scoring model is used for multiple queries; to determine the score for an image and a query, the model processes the image and the terms in the query. The non query-specific scoring model can be trained as described above.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA, or field programmable gate array, or an ASIC, or application-specific integrated circuit. The apparatus can also include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA, or field programmable gate array, or an ASIC, or application-specific integrated circuit.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system, comprising:
one or more computers; and
a computer-readable storage device storing instructions that, when executed by the one or more computers, cause the one or more computers to perform operations comprising:
   storing data identifying a plurality of training images for a query, wherein each of the training images is classified as being in a positive group of images for the query or a negative group of images for the query according to a respective query specific preference measure for the image;
   selecting a first image from either the positive group of images or the negative group of images, and applying a scoring model to the first image to determine a score for the first image;
   selecting a plurality of candidate images from the other group of images;
   applying the scoring model to each of the candidate images to determine a respective score for each candidate image, and then selecting a second image from the candidate images, the selection based on a probability that is proportional to a cardinality of the plurality of candidate images and a ranking of the second image relative to each other image in the candidate images based on the respective scores of the images; and
   determining that the scores for the first image and the second image fail to satisfy a criterion, wherein the criterion requires that a result of the score of the image selected from the positive group of images minus the score of the image selected from the negative group of images exceeds a threshold, updating the scoring model, and storing the updated scoring model.

2. The system of claim 1, wherein selecting the first image comprises:
   selecting a plurality of first candidate images from either the positive group of images or the negative group of images;
   applying the scoring model to each of the first candidate images to determine a respective score for each first candidate image; and
   selecting the first image based on a probability that is proportional to a cardinality of the plurality of first candidate images and a ranking of the first image relative to each other image in the first candidate images based on the respective scores of the first candidate images.

3. The system of claim 1, wherein the first image is selected from the positive group of images and the plurality of candidate images are selected from the negative group of images.

4. The system of claim 1, wherein the first image is selected from the negative group of images and the plurality of candidate images are selected from the positive group of images.

5. The system of claim 1, wherein the respective query specific preference measure for each image is derived from a number of times users select the image in response to being presented with a search result for the query that includes the image.

6. The system of claim 1, wherein the operations further comprise:
   in response to receiving the query through a search interface, identifying a plurality of images responsive to the query;
   applying the scoring model to each of the plurality of images to determine a respective score for each image; and
   presenting images from the plurality of images in the search interface, wherein the images are presented in an order according to the respective score for each image.

7. The system of claim 6, wherein the scoring model is query specific and the operations further comprise:
   updating and storing a query specific scoring model each of the plurality of queries.

8. The system of claim 1, wherein the operations further comprise repeating selecting the first image, selecting the second image, and updating the scoring model until a training condition is satisfied.

9. A computer-readable storage device storing instructions that, when executed by the one or more computers, cause the one or more computers to perform operations comprising:
   storing data identifying a plurality of training images for a query, wherein each of the training images is classified as being in a positive group of images for the query or a negative group of images for the query according to a respective query specific preference measure for the image;
   selecting a first image from either the positive group of images or the negative group of images, and applying a scoring model to the first image to determine a score for the first image;
   selecting a plurality of candidate images from the other group of images;
   applying the scoring model to each of the candidate images to determine a respective score for each candidate image, and then selecting a second image from the candidate images, the selection based on a probability that is proportional to a cardinality of the plurality of candidate images and a ranking of the second image relative to each other image in the candidate images based on the respective scores of the images; and
   determining that the scores for the first image and the second image fail to satisfy a criterion, wherein the criterion requires that a result of the score of the image selected from the positive group of images minus the score of the image selected from the negative group of images exceeds a threshold, updating the scoring model, and storing the updated scoring model.

10. The computer-readable storage device of claim 9, wherein selecting the first image comprises:
    selecting a plurality of first candidate images from either the positive group of images or the negative group of images;
    applying the scoring model to each of the first candidate images to determine a respective score for each first candidate image; and
    selecting the first image based on a probability that is proportional to a cardinality of the plurality of first candidate images and a ranking of the first image relative to each other image in the first candidate images based on the respective scores of the first candidate images.

11. The computer-readable storage device of claim 9, wherein the first image is selected from the positive group of images and the plurality of candidate images are selected from the negative group of images.

12. The computer-readable storage device of claim 9, wherein the first image is selected from the negative group of images and the plurality of candidate images are selected from the positive group of images.

13. The computer-readable storage device of claim 9, wherein the respective query specific preference measure for each image is derived from a number of times users select the image in response to being presented with a search result for the query that includes the image.

14. The computer-readable storage device of claim 9, wherein the operations further comprise:
- in response to receiving the query through a search interface, identifying a plurality of images responsive to the query;
- applying the scoring model to each of the plurality of images to determine a respective score for each image; and
- presenting images from the plurality of images in the search interface, wherein the images are presented in an order according to the respective score for each image.

15. The computer-readable storage device of claim 14, wherein the scoring model is query specific and the operations further comprise:
- updating and storing a query specific scoring model each of the plurality of queries.

16. The computer-readable storage device of claim 9, wherein the operations further comprise repeating selecting the first image, selecting the second image, and updating the scoring model until a training condition is satisfied.

17. A method performed by a data processing apparatus, comprising:
- storing data identifying a plurality of training images for a query, wherein each of the training images is classified as being in a positive group of images for the query or a negative group of images for the query according to a respective query specific preference measure for the image;
- selecting, by the data processing apparatus, a first image from either the positive group of images or the negative group of images, and applying a scoring model to the first image to determine a score for the first image;
- selecting, by the data processing apparatus, a plurality of candidate images from the other group of images;
- applying the scoring model to each of the candidate images to determine a respective score for each candidate image, and then selecting a second image from the candidate images, the selection based on a probability that is proportional to a cardinality of the plurality of candidate images and a ranking of the second image relative to each other image in the candidate images based on the respective scores of the images; and
- determining that the scores for the first image and the second image fail to satisfy a criterion, wherein the criterion requires that a result of the score of the image selected from the positive group of images minus the score of the image selected from the negative group of images exceeds a threshold, updating the scoring model, and storing the updated scoring model.

18. The method of claim 17, wherein selecting the first image comprises:
- selecting a plurality of first candidate images from either the positive group of images or the negative group of images;
- applying the scoring model to each of the first candidate images to determine a respective score for each first candidate image; and
- selecting the first image based on a probability that is proportional to a cardinality of the plurality of first candidate images and a ranking of the first image relative to each other image in the first candidate images based on the respective scores of the first candidate images.

19. The method of claim 17, wherein the first image is selected from the negative group of images and the plurality of candidate images are selected from the positive group of images.

20. The method of claim 17, wherein the respective query specific preference measure for each image is derived from a number of times users select the image in response to being presented with a search result for the query that includes the image.

* * * * *